United States Patent
Takahashi et al.

(10) Patent No.: US 10,873,086 B2
(45) Date of Patent: Dec. 22, 2020

(54) BINDER FOR NONAQUEOUS ELECTROLYTE SECONDARY BATTERY ELECTRODES, ELECTRODE MIXTURE FOR NONAQUEOUS ELECTROLYTE SECONDARY BATTERIES, ELECTRODE FOR NONAQUEOUS ELECTROLYTE SECONDARY BATTERIES, NONAQUEOUS ELECTROLYTE SECONDARY BATTERY AND ELECTRICAL DEVICE

(71) Applicant: SUMITOMO SEIKA CHEMICALS CO., LTD., Hyogo (JP)

(72) Inventors: Erina Takahashi, Hyogo (JP); Shun Hashimoto, Hyogo (JP); Junichi Fujishige, Hyogo (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 42 days.

(21) Appl. No.: 16/086,347

(22) PCT Filed: Jan. 13, 2017

(86) PCT No.: PCT/JP2017/001093
§ 371 (c)(1),
(2) Date: Sep. 19, 2018

(87) PCT Pub. No.: WO2017/168947
PCT Pub. Date: Oct. 5, 2017

(65) Prior Publication Data
US 2019/0097236 A1    Mar. 28, 2019

(30) Foreign Application Priority Data

Mar. 30, 2016  (JP) ................. 2016-068947

(51) Int. Cl.
| | |
|---|---|
| H01M 4/62 | (2006.01) |
| H01M 4/13 | (2010.01) |
| C08L 29/04 | (2006.01) |
| C08L 71/02 | (2006.01) |
| H01M 4/139 | (2010.01) |

(52) U.S. Cl.
CPC .............. *H01M 4/622* (2013.01); *C08L 29/04* (2013.01); *C08L 71/02* (2013.01); *H01M 4/13* (2013.01); *H01M 4/139* (2013.01); *H01M 4/62* (2013.01); *C08L 2203/20* (2013.01)

(58) Field of Classification Search
CPC .......... H01M 4/622; C08L 71/02; C08L 29/04

USPC ................. 252/500, 511, 182.1; 429/217
See application file for complete search history.

(56) References Cited

U.S. PATENT DOCUMENTS

| | | | |
|---|---|---|---|
| 4,846,994 A | 7/1989 | Kud et al. | |
| 5,153,082 A | 10/1992 | Ogino et al. | |
| 5,525,444 A * | 6/1996 | Ito .................. | H01M 4/621 |
| | | | 429/206 |
| 2011/0003202 A1* | 1/2011 | Wakizaka ............ | H01M 4/139 |
| | | | 429/209 |
| 2011/0163272 A1 | 7/2011 | Ono et al. | |
| 2012/0070737 A1 | 3/2012 | Son et al. | |
| 2012/0141859 A1 | 6/2012 | Murata et al. | |
| 2015/0179357 A1 | 6/2015 | Ichinomiya et al. | |
| 2015/0280237 A1* | 10/2015 | Mukai ................. | H01M 4/136 |
| | | | 252/506 |
| 2016/0156024 A1 | 6/2016 | Kinpara et al. | |

FOREIGN PATENT DOCUMENTS

| | | | | |
|---|---|---|---|---|
| AU | 2003-284631 A1 | 6/2004 | | |
| JP | H04-188559 A | 7/1992 | | |
| JP | H07-240201 A | 9/1995 | | |
| JP | H08-264180 A | 10/1996 | | |
| JP | H10-284082 A | 10/1998 | | |
| JP | H10-294112 A | 11/1998 | | |
| JP | H10-302799 A | 11/1998 | | |
| JP | 2012-064574 A | 3/2012 | | |
| JP | 2015-201267 A | 11/2015 | | |
| JP | 2015201267 A * | 11/2015 | ............. | H01M 4/62 |
| KR | 20090019630 A * | 2/2012 | ............. | H01M 4/62 |
| WO | WO 2004/049475 A1 | 6/2004 | | |
| WO | WO 2010/026627 A1 | 3/2010 | | |
| WO | WO 2010/134585 A1 | 11/2010 | | |
| WO | WO 2014/030208 A1 | 2/2014 | | |
| WO | WO2014047627 A1 * | 4/2014 | ............. | H01M 4/62 |
| WO | WO 2014/207967 A1 | 12/2014 | | |

OTHER PUBLICATIONS

"Lithium Secondary Batteries," pp. 132-134 (published by Ohmsha Ltd. on Mar. 20, 2008).
International Searching Authority, International Search Report (ISR) and Written Opinion for International Application No. PCT/JP2017/001093, dated Mar. 28, 2017, 9 pages, Japan Patent Office, Japan.
Extended European Search Report for European Patent Application No. 17773497.7, dated Nov. 19, 2019, (6 pages), European Patent Office.

* cited by examiner

*Primary Examiner* — Tri V Nguyen
(74) *Attorney, Agent, or Firm* — Alston & Bird LLP

(57) ABSTRACT

This binder for nonaqueous electrolyte secondary battery electrodes contains: a copolymer of vinyl alcohol and an ethylenically unsaturated carboxylic acid alkali metal neutralized product; and a polyalkylene oxide.

16 Claims, No Drawings

BINDER FOR NONAQUEOUS ELECTROLYTE SECONDARY BATTERY ELECTRODES, ELECTRODE MIXTURE FOR NONAQUEOUS ELECTROLYTE SECONDARY BATTERIES, ELECTRODE FOR NONAQUEOUS ELECTROLYTE SECONDARY BATTERIES, NONAQUEOUS ELECTROLYTE SECONDARY BATTERY AND ELECTRICAL DEVICE

CROSS REFERENCE TO RELATED APPLICATIONS

This application is a national stage application, filed under 35 U.S.C. § 371, of International Application No. PCT/JP2017/001093, filed Jan. 13, 2017, which International Application claims priority to Japanese Application No. 2016-068947, filed Mar. 30, 2016, the contents of both of which as are hereby incorporated by reference in their entirety.

BACKGROUND

Technical Field

The present invention relates to: a binder for nonaqueous electrolyte secondary battery electrodes, an electrode mixture, for nonaqueous electrolyte secondary batteries, containing the binder, an electrode, for nonaqueous electrolyte secondary batteries, prepared using the electrode mixture; a nonaqueous electrolyte secondary battery including the electrode; and an electric device including the secondary battery.

Description of Related Art

In recent years, with widespread use of portable electronic devices such as notebook computers, smartphones, portable game devices, and personal digital assistants (PDAs), the need for reducing the size of secondary batteries for use as power sources and increasing the energy density has been growing in order to reduce the weight of these devices and to achieve the use of these devices for a longer period of time.

Particularly in recent years, secondary batteries have been more widely used as power sources for vehicles, such as electric vehicles and electric motorcycles. Secondary batteries for use of such power sources for vehicles need not only to be high in energy density, but also to be operable in a wide temperature range.

Nickel-cadmium batteries, nickel-hydrogen batteries, and other suitable batteries have conventionally been mainstream nonaqueous electrolyte secondary batteries. However, to satisfy the demand for reducing the size of secondary batteries and increasing the energy density, lithium ion secondary batteries tend to be more frequently used.

An electrode of a lithium ion secondary battery is usually produced as follows: active materials (electrode active materials) and a conductive agent are mixed with a binder solution or slurry made of a binder for battery electrodes (hereinafter referred to simply as a binder) dissolved in a solvent or dispersed in a dispersion medium to prepare a mixture slurry for battery electrodes (hereinafter simply referred to as slurry); the mixture slurry for battery electrodes is applied to current collectors; the solvent and the dispersion medium are removed by, for example, drying so that the active material current collectors themselves and the active materials themselves are bound together; and, as a result, the electrode of a lithium ion secondary battery is produced.

For example, a positive electrode is obtained by coating an aluminum foil current collector with slurry of a positive electrode mixture in which lithium cobaltate (LiCoO2) serving as an active material, polyvinylidene fluoride (PVdF) serving as a binder, and carbon black serving as a conductive assistant are dispersed in a dispersion medium, and drying the slurry coated on the current collector.

On the other hand, a negative electrode is obtained by coating a copper foil current collector with slurry of a negative electrode mixture in which graphite serving as an active material, carboxymethylbatteryulose (CMC), styrene-butadiene-rubber (SBR), PVdF, or polyimide serving as a binder, and carbon black serving as a conductive agent are dispersed in water or an organic solvent, and drying the slurry coated on the current collector.

Of relevance and cited are the following documents, as referenced elsewhere herein:

PATENT DOCUMENT 1: Japanese Unexamined Patent Publication No. H08-264180

PATENT DOCUMENT 2: Japanese Unexamined Patent Publication No. H04-188559

PATENT DOCUMENT 3: Japanese Unexamined Patent Publication No. H10-284082

PATENT DOCUMENT 4: Japanese Unexamined Patent Publication No. H07-240201

PATENT DOCUMENT 5: Japanese Unexamined Patent Publication No. H10-294112

PATENT DOCUMENT 6: International Publication No. WO 2004/049475

PATENT DOCUMENT 7: Japanese Unexamined Patent Publication No. H10-302799

PATENT DOCUMENT 8: Japanese Unexamined Patent Publication No. 2012-64574

NON-PATENT DOCUMENT 1: "LITHIUM SECONDARY BATTERIES," p. 132 (published by Ohmsha Ltd. on Mar. 20, 2008)

BRIEF SUMMARY

Due to the expansion of use of lithium ion secondary batteries, various kinds of graphite has been examined for negative electrode active materials directly contributing to electrode reaction for the purpose of increasing capacity. In particular, it has been known that the crystalline states of artificial graphite vary according to differences in raw material, carbonization temperature and other factors, leading to variations in the energy capacity of the negative electrode active materials. Thus, various types of materials such as readily carbonizable graphite (soft carbon), difficult-to-carbonize graphite (hard carbon), carbon fibers, and other types of graphite have been studied (see Patent Documents 1 to 3).

To further increase the capacity of lithium ion secondary batteries, various compounds have been suggested as electrode active materials directly contributing to electrode reaction. Silicon (Si), tin (Sn), and germanium (Ge) that can be alloyed with lithium, oxides and alloys of silicon (Si), tin (Sn), and germanium (Ge), and any other suitable materials have been studied as negative electrode active materials. These negative electrode active materials are higher in theoretical capacity density than carbon materials. In particular, silicon-containing particles such as silicon particles or silicon oxide particles are inexpensive, and thus have been widely studied (see Patent Documents 4 and 5 and Non-Patent Document 1).

However, it has been known that if silicon-containing particles, such as silicon particles or silicon oxide particles, are used as a negative electrode active material, the volume of the negative electrode active material varies significantly due to occlusion and release of lithium ions in charge/discharge, and thus, a negative electrode mixture is separated from a negative electrode current collector and the negative electrode active material is removed.

Furthermore, if various types of graphite is used as a negative electrode active material, such factors as the surface state, surface area, and density of a crystallite layer of these types of graphite vary. Thus, polyvinylidene fluoride (PVDF) that has conventionally been used as a binder needs to be used in large amount due to its low binding capacity and flexibility. In addition, since PVDF is soluble only in an organic solvent, a binder that can reduce the load on the environment has been required (see Patent Documents 6 and 7). The fact that it is necessary to use a large amount of the binder means that the amount of the active material decreases, the battery capacity decreases, and the resistance inside the battery increases.

Use of styrene butadiene rubber (SBR), which is a rubbery polymer as an aqueous binder, is under study as an aqueous binder expected to have an effect of reducing environmental load without reducing binding capacity. However, the problem is that the presence of SBR (i.e., an insulator and having properties of rubber) on the surface of an active material keeps from obtaining sufficient rate performance; that is, the resistance in the electrode becomes inevitably high.

The present invention intends to provide a binder, for an electrode, capable of obtaining a low-resistance nonaqueous electrolyte secondary battery.

After thorough studies conducted to overcome the above problems, the inventors of the present invention have found out that a low-resistance nonaqueous electrolyte secondary battery can be obtained, using a binder, for a nonaqueous electrolyte secondary battery electrode, including a copolymer having a specific composition and polyalkylene oxide as essential components. This is how the inventors have implemented the present invention.

In other words, the binder for a nonaqueous electrolyte secondary battery electrode of the present invention includes: a copolymer of vinyl alcohol and an alkali metal-neutralized product of ethylene-unsaturated carboxylic acid; and polyalkylene oxide.

In the copolymer, a molar ratio of the vinyl alcohol to the alkali metal-neutralized product of ethylene-unsaturated carboxylic acid is preferably 95/5 to 5/95.

The alkali metal-neutralized product of ethylene-unsaturated carboxylic acid is preferably an alkali metal-neutralized product of acrylic acid or an alkali metal-neutralized product of methacrylic acid.

A mass ratio of the copolymer to the polyalkylene oxide is preferably 95/5 to 30/70.

The polyalkylene oxide is preferably at least one selected from the group consisting of polyethylene oxide and polypropylene oxide.

An electrode mixture for a nonaqueous electrolyte secondary battery includes: an electrode active material; a conductive agent; and the above binder.

A content of the binder is preferably 0.5% by mass to 40% by mass with respect to 100% by mass of a total amount of the electrode active material, the conductive agent, and the binder.

An electrode for a nonaqueous electrolyte secondary battery is prepared using the above electrode mixture for a nonaqueous electrolyte secondary battery.

A nonaqueous electrolyte secondary battery includes the above electrode mixture for a nonaqueous electrolyte secondary battery.

An electric device includes the above nonaqueous electrolyte secondary battery.

Because of the above features of the binder for a nonaqueous electrolyte secondary battery electrode according to the present invention, the use of the binder makes it possible to obtain a low-resistance nonaqueous electrolyte secondary battery.

DETAILED DESCRIPTION OF VARIOUS EMBODIMENTS

<Binder for Nonaqueous Electrolyte Secondary Battery Electrode>

A binder for a nonaqueous electrolyte secondary battery electrode (also referred to as "the binder according to the present invention") contains, as essential components, (i) a copolymer of vinyl alcohol and an alkali metal-neutralized product of ethylene-unsaturated carboxylic acid, and (ii) polyalkylene oxide.

[Copolymer of Vinyl Alcohol and Alkali Metal-Neutralized Product of Ethylene-Unsaturated Carboxylic Acid]

The above "copolymer of the vinyl alcohol and the alkali metal-neutralized product of ethylene-unsaturated carboxylic acid" (may be simply referred to as a "copolymer") means a copolymer containing vinyl alcohol and alkali metal-neutralized product of ethylene-unsaturated carboxylic acid as monomers. The copolymer can be made of, for example, a copolymer obtained through copolymerizing vinyl ester and ethylene-unsaturated carboxylic acid ester, and saponifying the copolymer in an mixed solvent including an aqueous organic solvent and water in the presence of alkali containing an alkali metal. Specifically, vinyl alcohol itself is unstable and cannot be used as a monomer as it is. However, if a polymer obtained using vinyl ester as a monomer is saponified, the polymer thus produced ends up as a polymer obtained through polymerization of vinyl alcohol as a monomer.

Examples of the above vinyl ester include vinyl acetate and vinyl propionate. Because of faster progress on saponification reaction, the vinyl acetate is preferable. A single type of the vinyl ester may be used alone, or two or more types of the vinyl ester may be used in combination.

Examples of the above ethylene-unsaturated carboxylic acid ester include methyl ester, ethyl ester, n-propyl ester, iso-propyl ester, n-butyl ester, and t-butyl ester of acrylic acid and methacrylic acid. Because of faster progress on saponification reaction, methyl acrylate and methyl methacrylate are preferable. A single type of the ethylene-unsaturated carboxylic acid ester may be used alone, or two or more types of the ethylene-unsaturated carboxylic acid ester may be used in combination.

If necessary, the vinyl ester and the ethylene-unsaturated carboxylic acid ester may be copolymerized with other types of ethylene-unsaturated monomer or cross-linker which can be copolymerized with the vinyl ester and the ethylene-unsaturated carboxylic acid ester.

The saponification reaction in 100% saponification of the vinyl acetate/methyl acrylate copolymer by potassium hydroxide (KOH) is shown below as an example of the saponification reaction in the present embodiment:

[Chemical Formula 1]

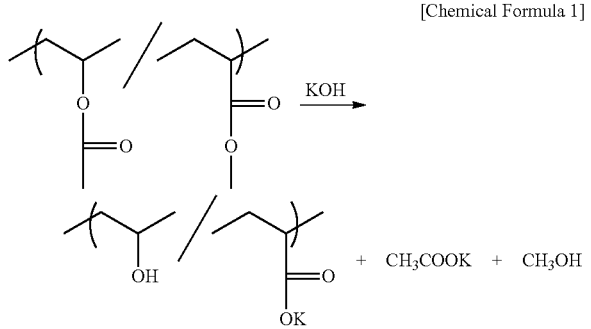

As shown above, the copolymer of the vinyl alcohol and the alkali metal-neutralized product of ethylene-unsaturated carboxylic acid according to this embodiment is a substance produced by random copolymerization of the vinyl ester and the ethylene-unsaturated carboxylic acid ester and saponification of ester derived from monomer. On the other hand, Patent Document 8 discloses a crosslinked compound of polyacrylic acid substituted with alkali cations and polyvinyl alcohol. This crosslinked compound has a structure in which polyacrylic acid and polyvinyl alcohol are crosslinked by ester bond. Thus, the crosslinked compound of polyacrylic acid substituted with alkali cations and polyvinyl alcohol disclosed in Patent Document 8 is a substance quite different from the copolymer of the vinyl alcohol and the alkali metal-neutralized product of ethylene-unsaturated carboxylic acid according to this embodiment.

In view of obtaining the copolymer in the form of powder, the copolymer of the vinyl ester and the ethylene-unsaturated carboxylic acid ester, which is a precursor of the copolymer of the vinyl alcohol and the alkali metal-neutralized product of ethylene-unsaturated carboxylic acid, is preferably obtained by suspension polymerization in which a monomer containing vinyl ester as the main component and a monomer containing ethylene-unsaturated carboxylic acid ester as the main component are polymerized into polymer particles while being suspended in an aqueous solution containing a polymerization catalyst and a dispersant dissolved.

Examples of the polymerization catalyst may include organic peroxides such as benzoyl peroxide and lauryl peroxide, and azo compounds such as azobisisobutyronitrile and azobisdimethylvaleronitrile. Among other things, lauryl peroxide is particularly suitable.

The additive amount of the polymerization catalyst with respect to the total mass of the monomers is preferably greater than or equal to 0.01% by mass and equal to or less than 5% by mass, more preferably greater than or equal to 0.05% by mass and equal to or less than 3% by mass, and still more preferably greater than or equal to 0.1% by mass and equal to or less than 3% by mass.

If the additive amount is less than 0.01% by mass, polymerization reaction may not be completed. If the additive amount exceeds 5% by mass, a sufficient effect of increasing the viscosity of the resultant copolymer of the vinyl alcohol and the alkali metal-neutralized product of ethylene-unsaturated carboxylic acid may not be exhibited.

Examples of the above dispersant specifically include (though they may vary depending on the type, amount, etc., of monomer to be used): polyvinyl alcohol (partially-saponified polyvinyl alcohol or completely-saponified polyvinyl alcohol); poly(meth)acrylic acid and salt thereof; water-soluble polymers such as polyvinylpyrrolidone, methylcellulose, carboxymethylcellulose, hydroxyethylcellulose; and water-insoluble inorganic compounds such as calcium phosphate and magnesium silicate. A single type of these dispersants may be used alone, or two or more types of these dispersants may be used in combination.

The use of the dispersant with respect to the total mass of the monomer, which may vary depending on, for example, the type of monomer to be used, is preferably greater than or equal to 0.01% by mass and equal to or less than 10% by mass, and more preferably greater than or equal to 0.05% by mass and equal to or less than 5% by mass.

Moreover, in order to adjust, for example, the surface-active effect of the dispersant, water-soluble salt of alkali metal or alkaline earth metal may be added. Examples of such water-soluble salt include sodium chloride, potassium chloride, calcium chloride, lithium chloride, sodium sulfate, potassium sulfate, disodium hydrogen phosphate, dipotassium hydrogenphosphate, trisodium phosphate, and tripotassium phosphate. A single type of these water-soluble salts may be used alone, or two or more types of these water-soluble salts may be used in combination.

The use of the water-soluble salt with respect to the mass of the aqueous dispersant solution, which may vary depending on the type, amount, etc. of water-soluble salt to be used, is typically greater than or equal to 0.01% by mass and equal to or less than 10% by mass.

The temperature at which the monomers are polymerized differs from the ten-hour half-life temperature of the polymerization catalyst preferably by not less than −20° C. and not more than +20° C., more preferably by not less than −10° C. and not more than +10° C.

If the polymerization temperature is lower than the ten-hour half-life temperature by less than 20° C., the polymerization reaction may not be completed. If the polymerization temperature is higher than the ten-hour half-life temperature by more than 20° C., a sufficient effect of increasing the viscosity of the resultant copolymer of the vinyl alcohol and the alkali metal-neutralized product of ethylene-unsaturated carboxylic acid may not be exhibited.

The period of time for which the monomers are polymerized is usually several hours to several tens of hours, although the period varies depending on the type, amount, and polymerization temperature of the polymerization catalyst used and other factors.

After the polymerization reaction has been completed, the copolymer is separated by a process such as centrifugation or filtration, and is obtained in a wet cake form. The copolymer obtained in the wet cake form may be subjected to saponification either as it is or after dried if necessary.

The number average molecular weight of the copolymer (before saponification) may be determined by using a polar solvent, such as DMF, as a solvent, in a molecular weight measuring device including a gel filtration chromatography (GFC) column (OH pak manufactured by Shodex), and any other suitable components.

The number average molecular weight of the copolymer (before saponification) is preferably 10,000 or more and 8,000,000 or less, and more preferably 50,000 or more and 1,000,000 or less. By setting the number average molecular weight before saponification within the range from 10,000 or more to 8,000,000 or less, the binding capacity as a binder improves. Therefore, even aqueous slurry can be easily applied thick.

The saponification reaction can be performed in the mixed solvent of the aqueous organic solvent and the water in the presence of alkali containing alkali metal. Conventionally known alkali may be used as alkali for use in the saponification. Alkali metal hydroxides are preferable, and sodium hydroxide and potassium hydroxide are particularly preferable because of their high reactivity.

The amount of the alkali with respect to the number of moles of the monomers is preferably more than or equal to 60 mol % and less than or equal to 140 mol %, and more preferably more than or equal to 80 mol % and less than or equal to 120 mol %. If the alkali amount is less than 60 mol %, saponification may be insufficient. Even if the amount of alkali to be used is greater than 140 mol %, a further effect is not exhibited, and therefore, such use of the alkali is not economical.

Examples of the aqueous organic solvent include lower alcohols such as methanol, ethanol, n-propanol, isopropanol, n-butanol, and t-butanol, ketones such as acetone and methyl ethyl ketone, and a mixture thereof. Among these solvents, the lower alcohols are preferable. Since the copolymer of the vinyl alcohol and the alkali metal-neutralized product of ethylene-unsaturated carboxylic acid can be obtained with an excellent effect of increasing the viscosity of the copolymer and excellent resistance to mechanical shear, the methanol and the ethanol are particularly preferable.

The mixing ratio (mass ratio) of the aqueous organic solvent and water in the mixed solvent is preferably from 3/7 to 8/2, more preferably from 3/7 to 7/3, and still more preferably from 4/6 to 6/4. If the mixture ratio is outside the range from 3/7 to 8/2, the saponification reaction may not progress to a satisfactory extent due to the lack of solvent affinity of the copolymer before or after saponification. If the ratio of the aqueous organic solvent to the total amount of the aqueous organic solvent and water is less than 3, not only the binding capacity as a binder decreases, but also the viscosity of the copolymer significantly increases during the saponification reaction. Hence, it is industrially difficult to obtain a saponified copolymer product. If the ratio of the aqueous organic solvent to the total amount of the aqueous organic solvent and water exceeds 8, water-solubility of the saponified copolymer product to be obtained could decrease. If the copolymer is used for an electrode, the binding capacity of the dried copolymer could be reduced. Note that when the copolymer obtained in the wet cake form is used for the saponification reaction as it is, the mixing ratio in the mixed solvent of the aqueous organic solvent to water includes water in the copolymer obtained in the wet cake form.

The temperature at which the vinyl ester/ethylene-unsaturated carboxylic acid ester copolymer is saponified, which may vary depending on the molar ratio of monomers, is preferably higher than or equal to 20° C. and lower than or equal to 60° C., and more preferably higher than or equal to 20° C. and lower than or equal to 50° C. If the copolymer is saponified at a temperature lower than 20° C., the polymerization reaction may not be completed. If the copolymer is saponified at a temperature higher than 60° C., viscosity during the reaction excessively increases such that the copolymer could not be stirred.

The saponification time varies depending on the type and amount of the alkali used and other factors. Usually, however, the saponification is completed in about a few to several hours.

Upon completion of the saponification, a dispersing element of a saponified copolymer is usually obtained in the form of paste or slurry. After the dispersing element has been subjected to solid-liquid separation by a conventionally known method such as centrifugation or filtration, the obtained product is well cleaned with a lower alcohol such as methanol. Then, the resultant liquid-containing saponified product of the copolymer is dried. As a result, a saponified product of the copolymer, i.e., a copolymer of the vinyl alcohol and the alkali metal-neutralized product of ethylene-unsaturated carboxylic acid, can be obtained in the form of spherical single particles or agglomerated particles formed by agglomeration of spherical particles.

An alkali metal-neutralized product of acrylic acid and an alkali metal-neutralized product of methacrylic acid are preferable as the alkali metal-neutralized product of ethylene-unsaturated carboxylic acid, and sodium acrylate and sodium methacrylate are more preferable as the alkali metal-neutralized product of ethylene-unsaturated carboxylic acid.

The conditions on which the liquid-containing saponified product of the copolymer is dried are not specifically limited. However, in general, the liquid-containing saponified product of the copolymer is suitably dried under normal pressure or reduced pressure at a temperature of 30° C. to 120° C.

The drying time is usually a few hours to several tens of hours, although it varies depending on the pressure and temperature during drying.

The mass mean particle size of the saponified copolymer product, i.e., the copolymer of the vinyl alcohol and the alkali metal-neutralized product of ethylene-unsaturated carboxylic acid, is preferably larger than or equal to 10 μm and smaller than or equal to 100 μm, and more preferably larger than or equal to 10 μm and smaller than or equal to 90 μm. If the mass mean particle size is less than 10 μm, sufficient effect of increasing the viscosity may not be exhibited. If the mass mean particle size exceeds 100 μm, the aqueous solution is not provided uniformly such that the increase in viscosity could be curbed.

If the mass mean particle size of the saponified copolymer product obtained after drying of the liquid-containing saponified copolymer product exceeds 100 μm, the mass mean particle size can be adjusted to be larger than or equal to 10 μm and smaller than or equal to 100 μm through milling, using a conventionally-known milling method such as mechanical milling.

The mechanical milling is a process in which an external force, such as shock, tension, friction, compression, or shear, is applied to the saponified copolymer product. Examples of devices used for this process include a tumbling mill, a vibration mill, a planetary mill, a rocking mill, a horizontal mill, an attritor mill, a jet mill, a grinding machine, a homogenizer, a fluidizer, a paint shaker, and a mixer. For example, the planetary mill grinds or mixes the saponified copolymer powder, put into a container together with balls, by mechanical energy generated by simultaneously rotating and revolving the powder and the balls. It has been known that this process allows the powder to be pulverized to the nano-order.

Regarding the effect of increase in the viscosity of the copolymer of the vinyl alcohol and the alkali metal-neutralized product of ethylene-unsaturated carboxylic acid, the viscosity of the aqueous solution (1% by mass solution) containing 1% by mass of the copolymer of the vinyl alcohol and the alkali metal-neutralized product of ethylene-unsaturated carboxylic acid is preferably greater than or equal to 50 mPa·s and smaller than or equal to 3,500 mPa·s, and more preferably greater than or equal to 70 mPa·s and smaller than or equal to 2,000 Pa·s. If the viscosity is less than 50 mPa·s, the viscosity of the slurried electrode mixture prepared is low. Hence, such a mixture spreads when applied to a current collector, making it difficult to be applied to the current collector. In addition, because of the low viscosity, the electrode active material and the conductive agent in the mixture might poorly disperse. If the viscosity exceeds 3,500 mPa·s, the viscosity of the mixture is excessively high, and therefore, it might be difficult to thinly and uniformly apply such a mixture to the current collector.

Note that the viscosity of the one-mass-percent aqueous solution can be measured using a rotary viscometer (type RVDV-I+) manufactured by Brookfield Engineering with a spindle No. 5 at 50 rpm (a liquid temperature of 25° C.).

In the copolymer of the vinyl alcohol and the alkali metal-neutralized product of ethylene-unsaturated carboxylic acid, the molar ratio of the vinyl alcohol to the alkali metal-neutralized product of ethylene-unsaturated carboxylic acid is preferably 95/5 to 5/95, more preferably 90/10 to 10/90, and still more preferably 80/20 to 20/80. Controlling the molar ratio within a range from 95/5 to 5/95 tends to further improve holding capability of the electrode mixture as a binder.

A content (blending amount) of the copolymer in the binder (100% by mass) according to the present invention is preferably from 15% by mass to 95% by mass, more preferably from 17.5% by mass to 85% by mass, and still more preferably from 20% by mass to 75% by mass. When the content of the copolymer is 15% by mass or more, deterioration of cycle life characteristics due to insufficient binding capacity tends to be reduced. On the other hand, when the content of the copolymer is 95% by mass or less, resistance of the electrode tends to be reduced.

[Polyalkylene Oxide]

The polyalkylene oxide is a polymer of an alkylene oxide. Examples of the alkylene oxide include aliphatic alkylene oxide having 2 to 4 carbon atoms such as ethylene oxide, propylene oxide, butylene oxide, more preferably aliphatic alkylene oxide having 2 to 3 carbon atoms such as ethylene oxide and propylene oxide. Examples of propylene oxide include 1,2-propylene oxide and 1,3-propylene oxide. Moreover, examples of butylene oxide include 1,2-butylene oxide, 2,3-butylene oxide, and isobutylene oxide. As a monomer of polyalkylene oxide, a single type of the alkylene oxide may be used alone, or two or more types of the alkylene oxide may be used in combination. In addition, the polyalkylene oxide may be a block copolymer or a random copolymer. Note that the polyalkylene oxide includes a component equivalent to a polymer of alkylene oxide. An example of such a component includes polyalkylene glycol (a polymer of alkylene glycol).

Specific examples of preferable polyalkylene oxide include polyethylene oxide, polypropylene oxide, polybutylene oxide, ethylene oxide-propylene oxide copolymer, ethylene oxide-butylene oxide copolymer, and propylene oxide-butylene oxide copolymer. These copolymers may be either block copolymers or random copolymers. Among the copolymers, polyethylene oxide and polypropylene oxide are preferable from the viewpoint of the smoothness of lithium insertion in and extraction reaction from the electrode due to high ionic conductivity.

As a viscosity average molecular weight, a molecular weight of the polyalkylene oxide is preferably from 50,000 to 5,000,000, more preferably from 80,000 to 4,000,000, still more preferably from 100,000 to 4,000,000. When the viscosity average molecular weight is 50,000 or more, coatability of the electrode mixture slurry tends to be improved due to the effect of increasing viscosity. On the other hand, when the viscosity average molecular weight is 5,000,000 or less, agglomeration of the electrode active material is reduced, and dispersibility of the electrode active material in the electrode mixture tends to improve. The viscosity average molecular weight of the polyalkylene oxide is calculated from a value of intrinsic viscosity measured with an Ostworld viscometer, using the Staudinger equation.

The polyalkylene oxide can be produced by a known method. An example of such a method is to polymerize alkylene oxide in the presence of an alkali catalyst or a metal catalyst. Examples of the polyalkylene oxide to be used include commercial products such as the product name "PEO" series (manufactured by Sumitomo Seika Co., Ltd.), the product name "POLYOX" series (manufactured by Dow Chemical Company), the product name "Alkox" series (manufactured by Meisei Chemical Works, Ltd), and the product name "Zeospan" series (manufactured by Zeon Corporation).

For the binder according to the present invention, a single type of polyalkylene oxide may be used alone, or two or more types of polyalkylene oxide may be used in combination.

A content (blending amount) of the polyalkylene oxide in the binder (100% by mass) according to the present invention is preferably from 2.5% by mass to 70% by mass, more preferably from 2.5% by mass to 65% by mass, still more preferably from 3.0% by mass to 60% by mass. When the content of the polyalkylene oxide is 2.5% by mass or more, resistance of the electrode tends to be further reduced. On the other hand, when the content of the polyalkylene oxide is 70% by mass or less, deterioration of cycle life characteristics due to insufficient binding capacity tends to be reduced.

The mass ratio of the copolymer to the polyalkylene oxide (copolymer/polyalkylene oxide) in the binder according to the present invention is preferably from 95/5 to 30/70, more preferably from 95/5 to 35/65, and still more preferably from 94/6 to 40/60. When the mass ratio is from 95/5 to 30/70, the resistance of the electrode tends to be further reduced, and deterioration of cycle life characteristics due to insufficient binding capacity tends to be reduced.

[Other Binders]

As a binder according to the present invention, the copolymer of the vinyl alcohol and the alkali metal-neutralized product of ethylene-unsaturated carboxylic acid, and polyalkylene oxide may additionally contain another binder (in particular, an aqueous binder). An example of the aqueous binder includes a binder soluble to or dispersible in water.

Examples of materials of the aqueous binder include carboxymethylcellulose (CMC), acrylic resin, sodium polyacrylate, sodium alginate, polyimide (PI), polyamide, polyamideimide, polyacryl, styrene-butadiene rubber (SBR), styrene-ethylene-butylene-styrene copolymer (SEBS), polyvinyl alcohol (PVA), and ethylene vinyl acetate copolymer (EVA). A single type of these materials may be used alone, or two or more types of these materials may be used in combination.

The content of the other binder in the binder according to the present invention can be appropriately adjusted in the range of 0 parts by mass to 100 parts by mass, for example, with respect to 100 parts by mass of the total amount of the copolymer and the polyalkylene oxide.

The binder according to the present invention can be produced by a known method. An example of the method is to mix together the copolymer, the polyalkylene oxide, and, as necessary, the other binder.

The binder according to the present invention can be used as a binder for a negative electrode, as well as a binder for a positive electrode, of the nonaqueous electrolyte secondary battery.

<Electrode Mixture for Nonaqueous Electrolyte Secondary Battery>

An electrode mixture for a nonaqueous electrolyte secondary battery according to the present invention (also referred to as "electrode mixture according to the present invention") is an electrode mixture for producing a nonaqueous electrolyte secondary battery. The electrode mixture contains as essential components a binder according to the present invention, an electrode active material, and a conductive agent.

The content of the binder according to the present invention in the electrode mixture (100% by mass) according to the present invention is preferably 0.5% by mass to 40% by mass, more preferably 1% by mass to 25% by mass, and still more preferably 1.5% by mass to 10% by mass. When the content of the binder is 0.5% by mass or more, deterioration of cycle life characteristics due to insufficient binding capacity and agglomeration due to insufficient viscosity of slurry tend to be reduced. On the other hand, when the content is 40% by mass or less, high battery capacity tends to be obtained when the battery is charged and discharged.

The electrode mixture of the present invention can be produced by a known method. An example of the method is to add the conductive agent, the binder according to the present invention, a dispersing agent (as necessary) and water to the electrode active material to form pasted slurry. The timing to add the water is not limited to particular timing. The binder according to the present invention may be previously dissolved into the water. Alternatively, the electrode active material, the conductive agent, the dispersion agent (as necessary), and the binder according to the present invention may be mixed together in a solid state, and the water may be added to the mixture.

The amount of water to be used is not limited to a particular amount. With respect to the total amount (100% by mass) of, for example, the electrode active material, the conductive agent, and the binder according to the present invention, the amount of water to be used is preferably 40% by mass to 2,000% by mass, more preferably 50% may mass to 1000% by mass. When the amount of water to be used is within the above range, handling properties of the electrode mixture (slurry) of the present invention tend to be further improved.

[Electrode Active Material]

An example of the electrode active material includes a negative electrode active material or a positive electrode active material.

(Negative Electrode Active Material)

The negative electrode active material to be used here is one to be used in this technical field. Examples of the negative electrode active material include carbon materials such as crystalline carbon and amorphous carbon. Examples of the crystalline carbon include graphite such as natural graphite or artificial graphite each of which is amorphous, tabular, flaky, spherical or fibrous. Examples of the amorphous carbon include soft carbon (graphitizable carbon) or hard carbon (non-graphatizable carbon), mesophase pitch carbide, and calcined coke. Furthermore, a material capable of inserting and extracting a large amount of lithium ions such as silicon (Si) or tin (Sn) can be used. With such materials, the effect of this embodiment can be exerted even if the materials are made of either a single substance or a composite active material containing an alloy, a compound, a solid solution, a silicon-containing material, and a tin-containing material. An example of the silicon-containing material to be used is an alloy, a compound, or a solid solution composed of (i) Si, (ii) SiOx ($0.05 \leq x \leq 1.95$), or (iii) Si or SiOx with portion of Si replaced with at least one or more selected from the group consisting of B, Mg, Ni, Ti, Mo, Co, Ca, Cr, Cu, Fe, Mn, Nb, Ta, V, W, Zn, C, N, Sn. These can be referred to as silicon or silicon compounds. Examples of the tin-containing material include $Ni_2Sn_4$, $Mg_2Sn$, SnOx ($0<x<2$), $SnO_2$, $SnSiO_3$, and LiSnO. A single type of these materials may be used alone, or two or more types of these materials may be used in combination. Among these materials, silicon alone, silicon such as silicon oxide, or a silicon oxide compound is preferable.

It is more preferable that: silicon or a silicon compound may be used as a first negative active material, and a carbon material may be used as a second negative active material; the first negative active material and the second negative active material are mixed together to obtain a composite; and the composite is used as the negative active material. In this case, the mixing ratio of the first and second negative electrode active materials is preferably from 5/95 to 95/5 in terms of mass ratio. As the carbon material, any carbon material commonly used in a nonaqueous electrolyte secondary battery can be used. Typical examples thereof include crystalline carbon, amorphous carbon, or both crystalline carbon and amorphous carbon. Examples of the crystalline carbon include graphite such as natural graphite or artificial graphite each of which is amorphous, tabular, flaky, spherical or fibrous. Examples of the amorphous carbon include soft carbon or hard carbon, mesophase pitch carbide, and calcined coke.

The method for producing the negative electrode active material is not limited to a particular method. A method for manufacturing an active material composite containing a mixture of the first and second negative electrode active materials is not limited to a particular method as long as both of the first and second negative electrode active materials are dispersed uniformly. An example of the method for manufacturing the negative electrode active material is to mix the first and second negative electrode active materials with a ball mill. Another example of the method is to cause the particle surface of the first negative electrode active material to support a second negative electrode active material precursor, and carbonate the second negative electrode active material precursor by heat treatment. The second negative electrode active material precursor is not limited to any particular precursor, as long as the precursor is a carbon precursor that can be a carbon material by heat treatment. Examples of the precursor include glucose, citric acid, pitch, tar, and binder materials. Examples of the binder materials include polyvinylidene fluoride, carboxymethylcellulose, acrylic resin, sodium polyacrylate, sodium alginate, polyimide, polytetrafluoroethylene, polyamide, polyamideimide, polyacryl, styrene-butadiene-rubber, polyvinyl alcohol, and ethylene-vinyl acetate copolymers.

The above heat treatment is a method in which heating is performed in a non-oxidizing atmosphere (in a state where it is difficult to oxidize a substance, such as in a reducing atmosphere, in an inert atmosphere, or in a reduced-pressure atmosphere) at 600° C. to 4,000° C., and the carbon precursor is thus carbonized to provide electrical conductivity.

(Positive Electrode Active Material)

The positive electrode active material to be used here is one to be used in this technical field. Examples of the preferably-used positive electrode active material include lithium iron phosphate ($LiFePO_4$), lithium manganese phosphate ($LiMnPO_4$), lithium cobalt phosphate ($LiCoPO_4$), iron pyrophosphate ($Li_2FeP_2O_7$), lithium cobaltate composite oxide ($LiCoO_2$), spinel type lithium manganese composite oxide ($LiMn_2O_4$), lithium manganese composite oxide (LiMnO$_2$), lithium nickel composite oxide (LiNiO$_2$), lithium niobium composite oxide (LiNbO$_2$), lithium iron composite oxide (LiFeO$_2$), lithium magnesium composite oxide (LiMgO$_2$), lithium calcium composite oxide (LiCaO$_2$), lithium copper composite oxide (LiCuO$_2$), lithium zinc composite oxide (LiZnO$_2$), lithium molybdenum composite oxide (LiMoO$_2$), lithium tantalum composite oxide (LiTaO$_2$), lithium tungsten composite oxide (LiWO$_2$), lithium-nickel-cobalt-aluminum composite oxide (LiNi$_{0.8}$Co0.15Al$_{0.05}$O$_2$), lithium-nickel-cobalt-manganese composite oxide (LiNi$_{0.33}$Co$_{0.33}$Mn$_{0.33}$O$_2$), Li-rich nickel-cobalt-manganese composite oxide, nickel manganese oxide (LiNi$_{0.5}$Mn$_{1.5}$O$_4$), manganese oxide (MnO$_2$), vanadium-based oxides, sulfur-based oxides, and silicate-based oxides.

(Conductive Agent)

The conductive agent to be used here is one to be used in this technical field. The conductive agent is not limited to a particular agent as long as the agent has conductivity. As the conductive agent, carbon powder is preferable. Examples of the carbon powder include commonly used carbon materials such as acetylene black (AB), ketjen black (KB), graphite, carbon fibers, carbon tubes, graphene, amorphous carbon, hard carbon, soft carbon, glassy carbon, carbon nanofibers, and carbon nanotubes. A single type of the carbon powder may be used alone, or two or more types of the carbon powder may be used in combination.

The amount of the conductive agent to be used is not limited to a particular amount. With respect to the total mass of, for example, the electrode active material, the conductive agent, and the binder, the mass of the conductive agent is preferably 0.1% by mass to 30% by mass, more preferably 0.5% may mass to 10% by mass, and still more preferably 2% by mass to 5% by mass. If the amount of the conductive agent to be used is less than 0.1% by mass, conductivity of the electrode could not be sufficiently improved. It is not preferable that the amount of the conductive assistant used be greater than 30% by mass because of the following reasons: First of all, it would be difficult to achieve a high capacity during charging/discharging of the battery because the proportion of the electrode active material would relatively decrease. Second, agglomeration of the electrode active material would be incurred because carbon that repels water would make it difficult for the active material to be dispersed uniformly. Third, the amount of the binder used would increase because the conductive agent is smaller in size, and thus has a larger surface area, than the electrode active material.

[Dispersion Agent]

The electrode mixture according to the present invention may further contain a dispersing agent. As the dispersion agent, an organic acid or a humic acid containing: at least one substituent selected from the group consisting of a hydroxyl group, an amino group, and an imino group; and a carboxy group. Examples of the organic acid having the hydroxyl group and the carboxy group include lactic acid, tartaric acid, citric acid, malic acid, glycolic acid, tartronic acid, glucuronic acid, and humic acid. Examples of the organic acid having the amino group and the carboxyl group include glycine, alanine, phenylalanine, 4-aminobutyric acid, leucine, isoleucine, lysine, glutamic acid, aspartic acid, glutamine, asparagine, histidine, tryptophan, cysteine, and a polymer of these substances. Examples of the organic acid having the imino group and the carboxyl group include proline, 3-hydroxyproline, 4-hydroxyproline, and pipecolic acid. Among these organic acids, glucuronic acid, humic acid, glycine, polyglycine, aspartic acid and glutamic acid are preferable because these substances are easily available.

Regarding the amount of the dispersion agent to be used, if the amount is 0.01% by mass or more with respect to the total mass of the electrode active material, the binder, and the conductive agent, materials such as the electrode active material in preparation of an electrode active material dispersion liquid can be finely dispersed efficiently and effectively. Note that in order to maintain fine dispersibility and dispersion stability, 5.0% by mass or less of the dispersion agent to be added is sufficient.

The electrode mixture of the present invention may contain, for example, other conventional additives.

In the electrode mixture according to the present invention, a copolymer of vinyl alcohol and alkali metal-neutralized product of ethylene-unsaturated carboxylic acid is used as a binder when the electrode mixture is used either for a positive electrode or a negative electrode. The binder is used for the purpose of adhesion between the electrode active materials, the electrode active material and the conductive agent, and the current collector and the electrode active material or the conductive agent. Specifically, the binder is used to form a good electrode active material layer when slurry is applied to current collectors of the both electrodes and dried.

<Electrode for Nonaqueous Electrolyte Secondary Battery>

The electrode for a nonaqueous electrolyte secondary battery according to the present invention (referred to as the "electrode according to the present invention") can be prepared by a technique to be used in this technical field, using the electrode mixture according to the present invention. The electrode according to the present invention can be prepared, for example, by applying the electrode mixture according to the present invention to a current collector and drying the electrode mixture.

When the electrode according to the present invention is a negative electrode, examples of the current collector include a conductive substance such as C, Cu, Ni, Fe, V, Nb, Ti, Cr, Mo, Ru, Rh, Ta, W, Os, Ir, Pt, Au, Al, or an alloy containing two or more of these conductive substances (for example, stainless steel). Alternatively, the current conductor may be made of Fe plated with Cu. From the viewpoints of high electrical conductivity, and excellent stability and oxidation resistance in an oxidant solution, examples of a preferable current collector for the negative electrode include Cu, Ni, and stainless steel. From the viewpoint of material costs, Cu and Ni are more preferable.

When the electrode according to the present invention is a positive electrode, examples of the current collector include a conductive substance such as C, Ti, Cr, Mo, Ru, Rh, Ta, W, Os, Ir, Pt, Au, Al, or an alloy containing two or more of these conductive substances (for example, stainless steel). From the viewpoints of high electrical conductivity and excellent stability and oxidation resistance in an oxidant solution, examples of a preferable current collector for the positive electrode include C, Al, and stainless steel. From the viewpoint of material costs, Al is more preferable.

The shape of the current collector is not limited to a particular shape. For example, a base material in the form of foil or a three-dimensional base material may be used. Note that if the three-dimensional base material (e.g., foamed metal, mesh, woven fabric, non-woven fabric, or an expanded metal) is used, the obtained electrode can achieve high capacity density even if the binder is short of adhesion with the current collector. In addition, favorable high-rate charge/discharge characteristics are exhibited.

<Nonaqueous Electrolyte Secondary Battery>

The nonaqueous electrolyte secondary battery according to the present invention (a nonaqueous electrolyte secondary battery including at least the electrode for a nonaqueous electrolyte secondary battery according to the present invention) is produced, using the electrode for the nonaqueous electrolyte secondary battery according to the present invention. The nonaqueous electrolyte secondary battery according to the present invention may be provided with, as one of the positive electrode or the negative electrode, or as both of the electrodes, the electrode for a nonaqueous electrolyte secondary battery according to the present invention. The method for producing the nonaqueous electrolyte secondary battery according to the present invention is one to be used in this technical field.

Among nonaqueous electrolyte secondary batteries according to the present invention, a lithium ion secondary battery is required to contain lithium ions. Hence, as the electrolyte for the lithium ion secondary battery, lithium salt is preferable. Examples of the lithium salt include lithium hexafluorophosphate, lithium perchlorate, lithium tetrafluoroborate, lithium trifluoromethanesulfonate, and lithium trifluoromethanesulfonimide. A single type of electrolyte may be used alone, or two or more types of electrolyte may be used in combination.

Examples of an electrolytic solution for the above electrolyte include propylene carbonate, ethylene carbonate, dimethyl carbonate, diethyl carbonate, and γ-butyrolactone. A single type of electrolytic solution may be used alone, or two or more types of electrolytic solution may be used in combination. In particular, preferable types of the electrolytic solution are propylene carbonate alone, a mixture of ethylene carbonate and diethyl carbonate, or γ-butyrolactone alone. The mixing ratio of the above mixture of ethylene carbonate and diethyl carbonate can be adjusted in any given manner within a range where one of the components is 10% by volume to 90% by volume.

<Electric Device>

The electric device according to the present invention includes at least the nonaqueous electrolyte secondary battery according to the present invention. Specifically, the electric device according to the present invention uses as a power supply at least the nonaqueous electrolyte secondary battery according to the present invention.

Examples of the electric device according to the present invention include an air conditioner, a washing machine, a television, a refrigerator, a personal computer, a tablet, a smartphone, a personal computer keyboard, a monitor, a printer, a mouse, a hard disk, a personal computer peripheral device, an iron, a clothes dryer, a transceiver, a blower, a music recorder, a music player, an oven, a microwave, a hot air heater, a car navigation system, a flashlight, a humidifier, a portable karaoke machine, a dry battery, an air purifier, a game machine, a sphygmomanometer, a coffee mill, a coffee maker, a kotatsu leg warmer, a copier, a disk changer, a radio, a shaver, a juicer, a shredder, a water purifier, lighting equipment, a dish dryer, a rice cooker, a trouser press, a vacuum cleaner, a weight scale, an electric carpet, an electric pot, an electronic dictionary, an electronic organizer, an electromagnetic cooker, a calculator, an electric cart, an electric wheelchair, an electric tool, an electric toothbrush, a foot warmer, a clock, an interphone, an air circulator, an electric insect killer, a hot plate, a toaster, a water heater, a crusher, a soldering iron, a video camera, a video cassette recorder, a fax machine, a futon mattress dryer, a mixer, a sewing machine, a rice cake machine, a water cooler, an electronic musical instrument, a motorcycle, toys, a lawn mower, a bicycle, an automobile, a hybrid car, a plug-in hybrid car, a train, a ship, an airplane, and an emergency storage battery.

EXAMPLES

The present invention will be more specifically described below with reference to examples; however, the present invention is not limited to these examples. The saponified product of the vinyl ester/ethylenically unsaturated carboxylic acid ester copolymer obtained in Production Example 3 is referred to as Copolymer A.

<Preparation of Copolymer A>

Copolymer A was prepared according to Production Examples 1 to 3 below.

Production Example 1

Synthesis of Vinyl Ester/Ethylene-Unsaturated Carboxylic Acid Ester Copolymer

In a two-liter reaction vessel equipped with a stirrer, a thermometer, an $N_2$ gas introducing pipe, a reflux condenser and a dripping funnel, 768 g of water and 12 g of anhydrous sodium were introduced, and the inside of the vessel was deoxygenated with $N_2$ blown into the vessel. Next, 1 g of partially-saponified polyvinyl alcohol (the degree of saponification was 88%) and 10 g of lauryl peroxide were introduced in the vessel and a temperature inside the vessel was raised to 60° C. After that, 104 g (1.209 mol) of methyl acrylate and 155 g (1.802 mol) of vinyl acetate were dripped from the dripping funnel for 4 hours. Then, the temperature inside the vessel was maintained at 65° C. for 2 hours. Then, the solid content was separated by filtration, and 288 g (containing 10.4% of water) of a vinyl ester/ethylenically unsaturated carboxylic acid ester copolymer of was obtained. After the obtained copolymer was dissolved in DMF, the DMF was filtered with a filter, and the molecular weight of the filtrate was measured using a molecular weight measuring device (2695, RI detector 2414, manufactured by Waters Corporation). The number average molecular weight calculated in terms of standard polystyrene was 188,000.

Production Example 2

Synthesis of Saponified Product of Vinyl Ester/Ethylene-Unsaturated Carboxylic Acid Ester Copolymer In a reaction vessel similar to the above reaction vessel, 450 g of methanol, 420 g of water, 132 g (3.3 mol) of sodium hydroxide, and 288 g (containing 10.4% of water) of the water-containing copolymer obtained in Production Example 1 were introduced. The introduced materials were stirred and saponified at a temperature of 30° C. for 3 hours. After completion of the saponification reaction, the obtained saponified copolymer was washed with methanol, filtered, and dried at 70° C. for 6 hours, such that 193 g of a saponified product of vinyl ester/ethylenically unsaturated carboxylic acid ester copolymer (a copolymer of vinyl alcohol and alkali metal-neutralized product of ethylene-unsaturated carboxylic acid in which alkali metal was sodium) was obtained. A mass mean particle size of the saponified product of the vinyl ester/ethylenically unsaturated carboxylic acid ester copolymer thus obtained was 180 μm.

Production Example 3

Pulverization of Saponified Product of Vinyl Ester/Ethylene-Unsaturated Carboxylic Acid Ester Copolymer With a jet mill (manufactured by Nippon Pneumatic Kogyo LJ), 193 g of the saponified product of the vinyl ester/ethylenically unsaturated carboxylic acid ester copolymer obtained in Production Example 2 was pulverized such that a saponified product of the vinyl ester/ethylenically unsaturated carboxylic acid ester copolymer (Copolymer A) of 173 g in fine powder was obtained. A particle size of the obtained saponified copolymer was measured with a laser diffraction type particle size distribution measuring apparatus (SALD-7100 manufactured by Shimadzu Corporation), and the obtained volume mean particle size was converted into a mass mean particle size. As a result, the mass mean particle size was 39 µm.

<Preparation of Binder, Electrode Mixture, and Electrode>

Example 1

Two parts by mass of Copolymer A obtained in Production Example 3 and 1 part by mass of polyethylene oxide (PEO-15: viscosity average molecular weight of 3,300,000 to 3,800,000, manufactured by Sumitomo Seika Co., Ltd.) were dissolved in 50 parts by mass of water, such that an aqueous solution of binder (a binder composition) was obtained.

Next, 96.5 parts by mass of artificial graphite (MAG-D manufactured by Hitachi Chemical Co., Ltd.) as an electrode active material and acetylene black (AB) (0.5 parts by mass of trade name Denka Black (registered trademark), manufactured by Denki Kagaku Kogyo Co.) were added to the aqueous binder solution and kneaded. Moreover, 70 parts by mass of water for adjusting viscosity was added to the aqueous binder solution and kneaded, such that a slurried negative electrode mixture was prepared.

The negative electrode mixture obtained was applied onto 10-µm-thick electrolytic copper foil, and dried. Then, the electrolytic copper foil and the applied film were tightly bonded together with a roll press (manufactured by Oono-Roll Corporation). Next, the bonded product was heated (under a reduced pressure at 140° C. for 3 hours or longer) such that a negative electrode was prepared. The thickness of an active material layer in the obtained negative electrode was 100 µm, and the capacity density of this negative electrode was 3.0 mAh/cm$^2$.

Example 2

A negative electrode was prepared in the same manner as Example 1, except that, instead of 2 parts by mass of Copolymer A and 1 part by mass of polyethylene oxide (PEO-15) in Example 1, 1.65 parts by mass of Copolymer A, and 1.35 parts by mass of polyethylene oxide (PEO-15) were used. The thickness of an active material layer in the obtained negative electrode was 103 µm, and the capacity density of this negative electrode was 3.0 mAh/cm$^2$.

Example 3

A negative electrode was prepared in the same manner as Example 1, except that, instead of 2 parts by mass of Copolymer A and 1 part by mass of polyethylene oxide (PEO-15) in Example 1, 1.5 parts by mass of Copolymer A and 1.5 parts by mass of polyethylene oxide (PEO-15) were used. The thickness of an active material layer in the obtained negative electrode was 105 µm, and the capacity density of this negative electrode was 3.0 mAh/cm$^2$.

Example 4

A negative electrode was prepared in the same manner as Example 1, except that, instead of 2 parts by mass of Copolymer A and 1 part by mass of polyethylene oxide (PEO-15) in Example 1, 1 part by mass of Copolymer A and 2 parts by mass of polyethylene oxide (PEO-15) were used. The thickness of an active material layer in the obtained negative electrode was 110 µm, and the capacity density of this negative electrode was 3.0 mAh/cm$^2$.

Example 5

A negative electrode was prepared in the same manner as Example 1, except that, instead of 1 part by mass of polyethylene oxide (PEO-15) in Example 1, 1 part by mass of polyethylene oxide (PEO-3: viscosity average molecular weight of 600,000 to 1,100,000) was used. The thickness of an active material layer in the obtained negative electrode was 98 µm, and the capacity density of this negative electrode was 3.0 mAh/cm$^2$.

Example 6

A negative electrode was prepared in the same manner as Example 1, except that, instead of 1 part by mass of polyethylene oxide (PEO-15) in Example 1, 1 part by mass of polyethylene oxide (PEO-1: viscosity average molecular weight of 150,000 to 400,000) was used. The thickness of an active material layer in the obtained negative electrode was 96 µm, and the capacity density of this negative electrode was 3.0 mAh/cm$^2$.

Example 7

A negative electrode was prepared in the same manner as Example 1, except that, instead of 2 parts by mass of Copolymer A, 1 part by mass of polyethylene oxide (PEO-15), and 96.5 parts by mass of artificial graphite in Example 1, 3.3 parts by mass of Copolymer A, 1.7 parts by mass of polyethylene oxide (PEO-15), 89.8 parts by mass of artificial graphite, and 4.7 parts by mass of SiO (5 µm, manufactured by OSAKA Titanium technologies Co., Ltd) were used. The thickness of an active material layer in the obtained negative electrode was 90 µm, and the capacity density of this negative electrode was 3.0 mAh/cm$^2$.

Example 8

A negative electrode was prepared in the same manner as Example 1, except that, instead of 1.7 parts by mass of polyethylene oxide (PEO-15) in Example 7, 1.7 parts by mass of polyethylene oxide (PEO-1: viscosity average molecular weight of 150,000 to 400,000) was used. The thickness of an active material layer in the obtained negative electrode was 88 µm, and the capacity density of this negative electrode was 3.0 mAh/cm$^2$.

Example 9

A negative electrode was prepared in the same manner as Example 1, except that, instead of 1.7 parts by mass of polyethylene oxide (PEO-15) in Example 7, 1.7 parts by mass of polyethylene oxide (PEO-1) was used. The thickness of an active material layer in the obtained negative electrode was 85 μm, and the capacity density of this negative electrode was 3.0 mAh/cm².

Comparative Example 1

A negative electrode was prepared in the same manner as Example 1, except that, instead of 2 parts by mass of Copolymer A and 1 part by mass of polyethylene oxide (PEO-15) in Example 1, 3 parts by mass of Copolymer A was used. The thickness of an active material layer in the obtained negative electrode was 99 μm, and the capacity density of this negative electrode was 3.0 mAh/cm².

Comparative Example 2

A negative electrode was prepared in the same manner as Example 1, except that, instead of 2 parts by mass of Copolymer A and 1 part by mass of polyethylene oxide (PEO-15) in Example 1, 3 parts by mass of polyethylene oxide (PEO-15) was used. The thickness of an active material layer in the obtained negative electrode was 88 μm, and the capacity density of this negative electrode was 3.0 mAh/cm².

Comparative Example 3

A negative electrode was prepared in the same manner as Example 1, except that, instead of 2 parts by mass of Copolymer A, 1 part by mass of polyethylene oxide (PEO-15), and 96.5 parts by mass of artificial graphite in Example 1, 5 parts by mass of Copolymer A, 89.8 parts by mass of artificial graphite, and 4.7 parts by mass of SiO were used. The thickness of an active material layer in the obtained negative electrode was 88 μm, and the capacity density of this negative electrode was 3.0 mAh/cm².

(Assembly of Battery)

Coin cells (CR 2032) were prepared using the negative electrodes obtained in Examples 1 to 9 and Comparative Examples 1 to 3 together with the counter electrode, the separator and the electrolyte solution shown below. Each coin cell was aged for 3 cycles at 0.1 C under an environment of 30° C., such that a sample (coin cell) was prepared.
Counter Electrode: Metallic Lithium
Separator: Glass Filter (trade name GA-100, manufactured by Advantech Co., Ltd.)
Electrolyte: A solution made of a solvent in which ethylene carbonate (EC) and diethyl carbonate (DEC) were mixed together at a volume ratio of 1:1, with $LiPF_6$ dissolved at a concentration of 1 mol/L in the solvent and 1% by mass of vinylene carbonate (VC) acting as an additive for electrolytic solution added to the solvent.

(Evaluation Method of Direct Current Resistance)

Each of the coin cells prepared in the above methods and having the negative electrodes obtained in Examples 1 to 9, and Comparative Examples 1 and 3 was charged at 0.2 C and discharged at 0.2 C, 0.5 C, 1 C, 3 C, and 5 C under an environment of 30° C. The cutoff potential was set to 0 V to 1.0 V (vs. Li+/Li) for the above coin cells. From the I-V characteristic obtained, the direct current resistance (DC-IR) of the battery was calculated. Table 1 shows DC resistances of Examples and Comparative Examples.

TABLE 1

| | Active Material | Polyalkylene Oxide Used | Rate of Total Amount of Binder Composition to Total Amount of Negative Electrode Active Material Layer | Mass Ratio of Copolymer A to Polyalkylene Oxide | Direct-Current Resistance (Ω) |
|---|---|---|---|---|---|
| Example 1 | Graphite | PEO-15 | 3 parts by mass | 67/33 | 50 |
| Example 2 | Graphite | PEO-15 | 3 parts by mass | 55/45 | 48 |
| Example 3 | Graphite | PEO-15 | 3 parts by mass | 50/50 | 48 |
| Example 4 | Graphite | PEO-15 | 3 parts by mass | 33/67 | 42 |
| Example 5 | Graphite | PEO-3 | 3 parts by mass | 67/33 | 41 |
| Example 6 | Graphite | PEO-1 | 3 parts by mass | 67/33 | 43 |
| Comparative Example 1 | Graphite | — | 3 parts by mass | 100/0 | 57 |
| Example 7 | Graphite + SiO | PEO-15 | 5 parts by mass | 67/33 | 60 |
| Example 8 | Graphite + SiO | PEO-3 | 5 parts by mass | 67/33 | 53 |
| Example 9 | Graphite + SiO | PEO-1 | 5 parts by mass | 67/33 | 59 |
| Comparative Example 3 | Graphite + SiO | — | 5 parts by mass | 100/0 | 78 |

(Peel Test)

A peel strength test was conducted for coating film (a negative electrode active material layer) of the current collector in the negative electrodes obtained in Examples 1 to 4, Comparative Examples 1 and 2. The negative electrode was cut into a piece having a width of 80 mm×15 mm, and adhesive tape was affixed to a surface (to the negative electrode active material layer) of the cut piece. Then, the cut negative electrode (to the current collector) was affixed to a stainless steel plate with double-sided tape. The affixed negative electrode was used as a sample for evaluation. Using this evaluation sample, a 180-degree peel test of the negative electrode with respect to the stainless-steel plate (a 180-degree peel test of the adhesive tape with respect to the negative electrode affixed to the stainless-steel plate) was conducted with a tensile tester (a small-sized desktop tensile tester EZ-Test manufactured by Shimadzu Corporation). A peel strength between the active material and the current collector in the negative electrode was measured. Table 2 shows the evaluation results of peel test (peel strength).

(Electrode Strength)

Based on whether the active material layers were peeled, dropped, or chipped when the electrodes obtained in Examples 1 to 4 and Comparative Examples 1, and 2 were punched into a diameter of 11 mm with a punching machine, the strength of the electrodes (referred to as "electrode strength") was evaluated. Table 2 shows the evaluation results of the electrode strength.

Good (Excellent in strength): Out of 10 electrodes arbitrarily punched out, 4 or fewer of the active material layers were visually observed to have the active material layers peeled off, dropped off, or chipped.

Poor (No good in strength): Out of 10 electrodes arbitrarily punched out, 5 or more of the active material layers were visually observed to have the active material layers peeled off, dropped off, or chipped.

TABLE 2

| | Polyalkylene Oxide Used | Mass Ratio of Copolymer A to Polyalkylene Oxide | Peel Strength (N/15 mm) | Electrode Strength |
|---|---|---|---|---|
| Example 1 | PEO-15 | 67/33 | 1.9 | Good |
| Example 2 | PEO-15 | 55/45 | 1.6 | Good |
| Example 3 | PEO-15 | 50/50 | 0.7 | Good |
| Example 4 | PEO-15 | 33/67 | 0.4 | Good |
| Comparative Example 1 | — | 100/0 | 2.8 | Good |
| Comparative Example 2 | PEO-15 | 0/100 | 0.1 or below | Poor |

Table 1 shows that, compared with the batteries of Comparative Example 1, the batteries of Examples 1 to 4 are lower in direct current resistance and higher in battery performance with an increasing amount of polyalkylene oxide contained in the binder compositions. Furthermore, Examples 1, 5 and 6 show that even if polyalkylene oxide is used in a different viscosity average molecular weight, an excellent battery with low resistance can be obtained. Moreover, in the batteries of Examples 7 to 9, a fall of the direct-current resistance was found even though the active material was a mixture of artificial graphite and SiO.

As shown in Table 2, when an electrode using both CMC and SBR to be used as typical negative electrode aqueous binders is evaluated in a peel test, the peel strength was 0.4 N/15 mm. In Examples 1 to 4, the obtained electrodes are found to be the same or better in peel strength as or than those in CMC+SBR (that is, existing article) and Comparative Example 2.

Use of the binder of the present invention makes it possible to obtain a battery high in peel and electrode strength and low in resistance.

The invention claimed is:

1. A binder for a nonaqueous electrolyte secondary battery electrode, the binder comprising:
   a copolymer of vinyl alcohol and an alkali metal-neutralized product of ethylene-unsaturated carboxylic acid; and
   polyalkylene oxide,
   wherein a mass ratio of the copolymer to the polyalkylene oxide is 95/5 to 30/70, and the polyalkylene oxide has a viscosity average molecular weight of 50,000 to 5,000,000.

2. The binder of claim 1, wherein, in the copolymer, a molar ratio of the vinyl alcohol to the alkali metal-neutralized product of ethylene-unsaturated carboxylic acid is 95/5 to 5/95.

3. The binder of claim 1, wherein the alkali metal-neutralized product of ethylene-unsaturated carboxylic acid is an alkali metal-neutralized product of acrylic acid or an alkali metal-neutralized product of methacrylic acid.

4. The binder of claim 1, wherein the polyalkylene oxide is at least one oxide selected from the group consisting of polyethylene oxide and polypropylene oxide.

5. The binder of claim 1, wherein the polyalkylene oxide has a viscosity average molecular weight of 150,000 to 3,800,000.

6. The binder of claim 1, wherein the polyalkylene oxide is polyethylene oxide.

7. The binder of claim 6, wherein the polyethylene oxide has a viscosity average molecular weight of 150,000 to 3,800,000.

8. An electrode mixture for a nonaqueous electrolyte secondary battery, the electrode mixture comprising:
   an electrode active material;
   a conductive agent; and
   the binder of claim 1.

9. The electrode mixture of claim 8, wherein a content of the binder is 0.5% by mass to 40% by mass with respect to 100% by mass of a total amount of the electrode active material, the conductive agent, and the binder.

10. An electrode for a nonaqueous electrolyte secondary battery, the electrode being prepared using the electrode mixture of claim 8.

11. A nonaqueous electrolyte secondary battery comprising the electrode of claim 10.

12. An electric device comprising the nonaqueous electrolyte secondary battery of claim 11.

13. A binder for a nonaqueous electrolyte secondary battery electrode, the binder comprising:
   a copolymer of vinyl alcohol and an alkali metal-neutralized product of ethylene- unsaturated carboxylic acid; and
   polyethylene oxide,
   wherein:
     the polyethylene oxide has a viscosity average molecular weight of 150,000 to 3,800,000; and
     either:
       a mass ratio of the copolymer to the polyethylene oxide is 95/5 to 30/70, or
       a molar ratio of the vinyl alcohol to the alkali metal-neutralized product of ethylene-unsaturated carboxylic acid is 95/5 to 5/95.

14. The binder of claim 13, wherein the alkali metal-neutralized product of ethylene-unsaturated carboxylic acid is an alkali metal-neutralized product of acrylic acid or an alkali metal-neutralized product of methacrylic acid.

15. An electrode mixture for a nonaqueous electrolyte secondary battery, the electrode mixture comprising:
   an electrode active material;
   a conductive agent; and
   the binder of claim 13.

16. The electrode mixture of claim 15, wherein a content of the binder is 0.5% by mass to 40% by mass with respect to 100% by mass of a total amount of the electrode active material, the conductive agent, and the binder.

* * * * *